(12) United States Patent
Ries et al.

(10) Patent No.: US 11,338,860 B2
(45) Date of Patent: May 24, 2022

(54) MULTI-FUNCTION MODULAR COVER FOR A ROOF ASSEMBLY

(71) Applicant: Caterpillar Paving Products Inc., Brooklyn Park, MN (US)

(72) Inventors: Michael W. Ries, Andover, MN (US); Joel N. Thieschafer, Champlin, MN (US); Keith D. Koshiol, Ramsey, MN (US); Eric S. LeDoux, Albertville, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 255 days.

(21) Appl. No.: 16/814,502

(22) Filed: Mar. 10, 2020

(65) Prior Publication Data

US 2021/0284244 A1    Sep. 16, 2021

(51) Int. Cl.
| | | |
|---|---|---|
| *B60J 7/00* | (2006.01) | |
| *B62D 25/06* | (2006.01) | |
| *H01Q 1/32* | (2006.01) | |
| *B60Q 1/26* | (2006.01) | |

(52) U.S. Cl.
CPC ............ *B62D 25/06* (2013.01); *B60Q 1/2611* (2013.01); *H01Q 1/3275* (2013.01)

(58) Field of Classification Search
CPC . B60R 19/18; B60R 19/34; B60R 2019/1813; B60R 2019/182; B60R 19/24; B62D 25/025
See application file for complete search history.

(56) References Cited

U.S. PATENT DOCUMENTS

| | | | |
|---|---|---|---|
| 5,695,238 A * | 12/1997 | Calamari | B62D 21/17 |
| | | | 280/756 |
| 5,913,566 A | 6/1999 | Stauffer et al. | |
| 6,254,263 B1 | 7/2001 | Mueller et al. | |
| 9,802,533 B2 * | 10/2017 | Ruffner | B60Q 1/0035 |
| 2019/0317521 A1 | 10/2019 | Nishi et al. | |
| 2021/0018617 A1 * | 1/2021 | Iwase | G01S 15/93 |
| 2021/0284019 A1 * | 9/2021 | Koshiol | B60N 2/78 |
| 2021/0309188 A1 * | 10/2021 | Jones | E02F 9/265 |

FOREIGN PATENT DOCUMENTS

| | | |
|---|---|---|
| CN | 103874806 A | 6/2014 |
| WO | 2016060022 A1 | 4/2016 |

* cited by examiner

*Primary Examiner* — Kiran B Patel
(74) *Attorney, Agent, or Firm* — von Briesen & Roper, s.c.; Jeff A. Greene

(57) ABSTRACT

A cover configured for attachment to the roof of an operator station of a work machine is disclosed. The cover may include at least one first compartment configured for partially containing a lighting device of the work machine. In addition, the cover may include at least one second compartment configured for partially containing a roof-mounted antenna of the work machine, the second compartment disposed in a generally upwardly-exposed portion of the cover when the cover is attached to the roof. Further, a roof assembly for an operator station of a work machine that incorporates the cover is disclosed. Furthermore, a method of manufacturing the cover is disclosed.

15 Claims, 6 Drawing Sheets

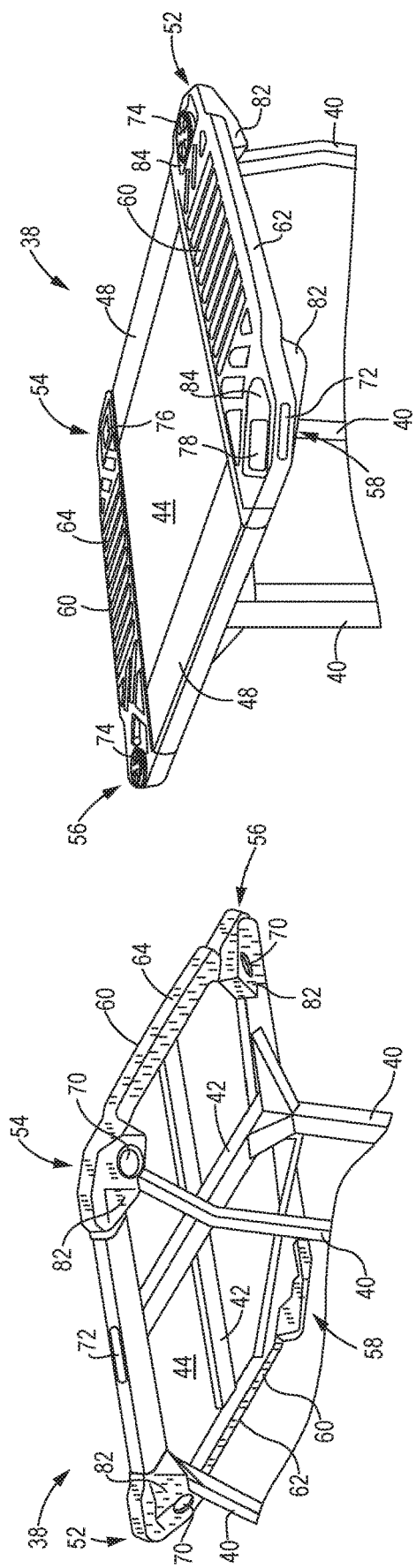
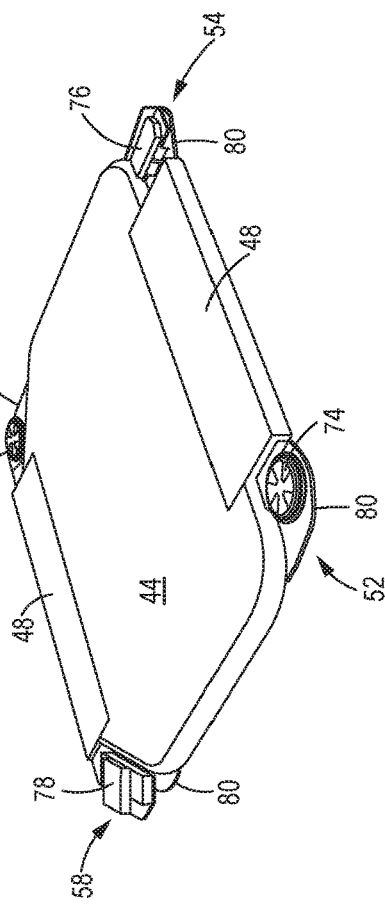
FIG. 2
FIG. 3
FIG. 4

MULTI-FUNCTION MODULAR COVER FOR A ROOF ASSEMBLY

TECHNICAL FIELD

The present disclosure generally relates to a roof assembly for an operator station of a work machine and, more particularly, relates to a multi-function roof cover for attachment to the roof.

BACKGROUND

A wide variety of work machines are employed in paving, construction, earth moving, agricultural and other industries. Among those machines are compactor machines, motor graders, wheel loaders, backhoe loaders, excavators, agricultural tractors, dozers, etc. Such machines may include an operator station from which an operator controls the machine and the attached implements. The operator station may be a fully enclosed cab having walls, windows, a floor and a roof, the operator seat and controls housed therein. Alternatively, the operator station may be an open-air station having a roof mounted above the station that substantially covers the operator seat and controls. While the roof of an operator station should provide ample overhead clearance for an operator stationed therein, the station should be relatively compact so as to contain any excessive increase in the machine's overall height, and be in compliance with conventional storage and shipping requirements. In this regard, roof accessories that add significant height to the machine may be disadvantageous.

In addition to protecting personnel from falling objects and other adverse environmental elements, the roof of the operator station may be equipped with lighting and other electronic devices necessary for the proper functioning of the work machine. For example, many work machines, including compactors, may be equipped with roof-mounted lighting solutions and antennas. Lighting options may include distance lighting, ground area lighting, beacon lighting and/or informational lighting; and antenna options may include global positioning system (GPS), cellular, radar, WIFI, satellite and/or radio technology. For example, work machines are commonly equipped with GPS technology for accurately mapping the machine's trajectory, as well as recording the machine's position. Moreover, cellular and satellite systems are commonly used for wireless communication between machines, as well as to transmit data to a controller for technical maintenance or otherwise, for example. These components may be bolted or otherwise fastened to the roof of the operator station, thereby potentially augmenting the height of the machine. In addition, such components are clearly visible to anyone who encounters the machine. Consequently, components such as high-tech antennas and high-value lights, being expensive enhancements to the work machines, are vulnerable to theft. In order to lessen the susceptibility of these components to theft, as well as to prevent damage to these components, some machines have been adapted with specialized mounting configurations that allow for these components to be removed and stored when the machine is not being operated or when the machine is being shipped. Not only does this adaptation add to the cost of employing such electronic components, the continual removal and reintroduction of these components to the machine is complicated, cumbersome, and may eventually result in damage to the machine and/or to the components. Other attempts at securing lights and antennas on work machine roofs more permanently have failed to provide for optimal placement of these components, and have also failed to obstruct their obvious visibility. As such, their vulnerability to damage and theft remains. U.S. Patent Application No. 2019/0317521, for example, discloses a work machine having roof-mounted lights and antennas; however, all such components are clearly visible and susceptible to both damage and theft.

The disclosed roof assembly for an operator station of a work machine, including a multi-function cover, and methods of manufacturing the cover are directed to overcoming one or more of the limitations set forth above and/or other problems of the prior art.

SUMMARY

In accordance with one aspect of the present disclosure, a cover configured for attachment to the roof of an operator station of a work machine is disclosed. The disclosed cover may include at least one first compartment configured for partially containing a lighting device of the work machine. Further, the cover may include at least one second compartment configured for partially containing a roof-mounted antenna of the work machine, the second compartment disposed in a generally upwardly-exposed portion of the cover when attached to the roof.

In accordance with another aspect of the present disclosure, a roof assembly for an operator station of a work machine is disclosed. The roof assembly may include a roof configured to substantially cover the operator station. The roof assembly may also include at least one lighting device and at least one roof-mounted antenna. Further, the roof assembly may include a cover attached to the roof, the cover having at least one first compartment that partially contains the lighting device and at least one second compartment that partially contains the roof-mounted antenna, the second compartment disposed in a generally upwardly-exposed portion of the cover.

In accordance with yet another aspect of the present disclosure, a method of manufacturing a cover configured for attachment to the roof of an operator station of a work machine is disclosed. The disclosed method may include the step of providing a mold for a plurality of covers, at least one of the covers including at least one first compartment configured for partially containing a lighting device and at least one second compartment configured for partially containing a roof-mounted antenna. In addition, the disclosed method may include the step of rotationally molding a plurality of covers using non-metallic material and the mold, the plurality of covers being joined together. Further, the disclosed method may include the step of sectioning the joined covers into individual covers and trimming the covers of unwanted non-metallic material.

These and other aspects and features of the present disclosure will be better understood when read in conjunction with the accompanying drawings.

BRIEF DESCRIPTION OF THE DRAWINGS

FIG. 2 is a perspective view of an exemplary embodiment of a roof and cover as seen from below, in accordance with the present disclosure;

FIG. 3 is a perspective view of an exemplary embodiment of a roof and cover as seen from above, in accordance with the present disclosure;

FIG. 4 is a perspective view of an exemplary embodiment of a roof without a cover as seen from above, in accordance with the present disclosure;

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

The presently disclosed modular covers and roof assemblies incorporating modular covers, as well as methods for manufacturing modular covers, overcome certain limitations in the prior art. The disclosure may apply to any work machines that perform operations associated with an industry such as paving, construction, farming, mining, manufacturing, transportation or any other industry known in the art. Specifically, the disclosed covers and roof assemblies may be incorporated on operator stations of any number of machines, including: compactors, motor graders, wheel loaders, backhoe loaders, excavators, agricultural tractors, dozers, etc. Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
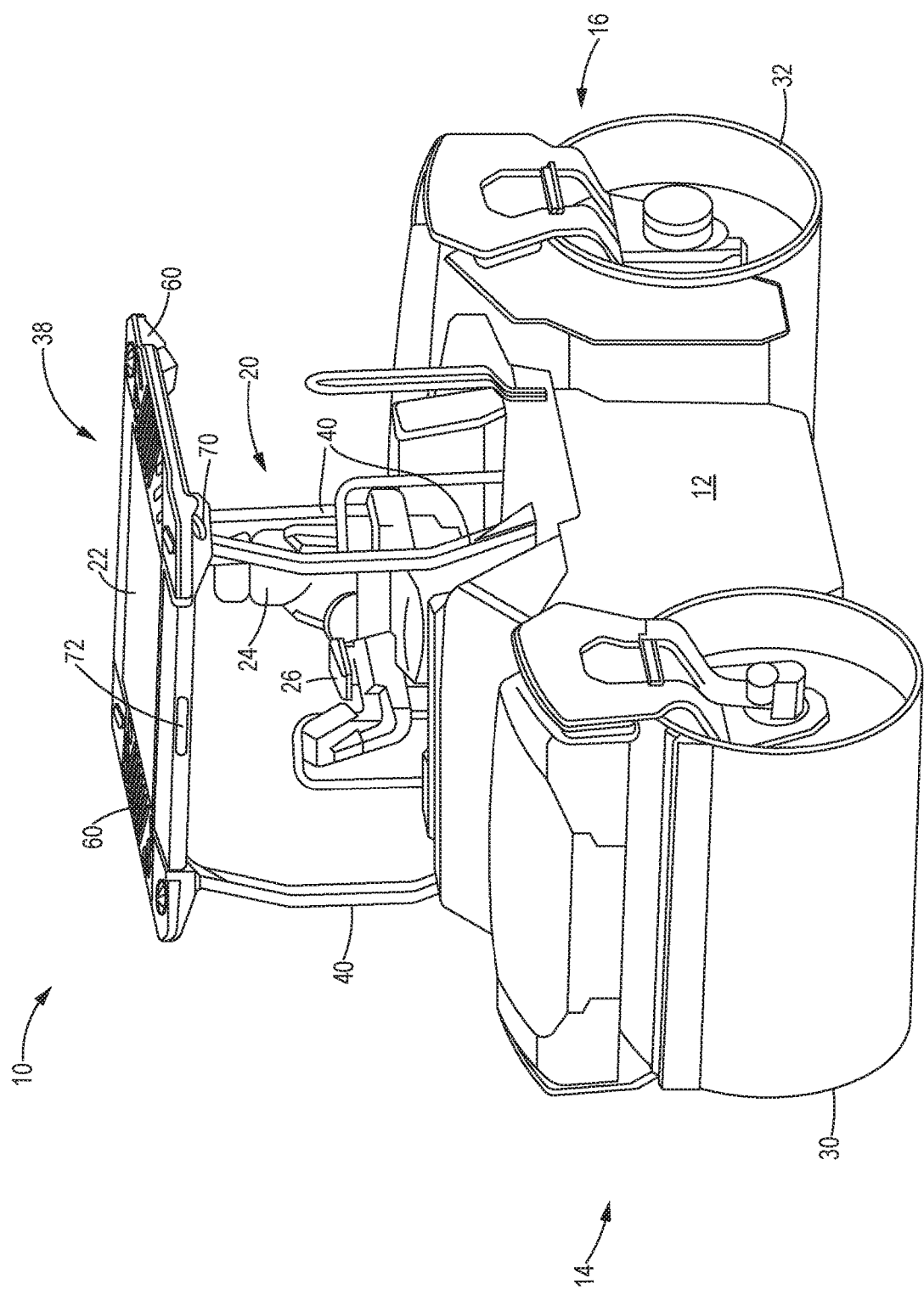
FIG. 1 is a perspective view of a compactor machine that embodies elements of the present disclosure.

FIG. 1 illustrates an exemplary work machine 10 that incorporates elements of the present disclosure. Specifically, FIG. 1 illustrates a compactor machine 10 having a frame 12, the machine 10 having a front end 14 and a back end 16. The machine 10 may be driven, and numerous functions of the machine 10 may be controlled, by an operator positioned in an operation station 20. Typically, the operator controls and monitors various movements of the machine 10. The operator station 20 is coupled to the frame 12 between the front end 14 and the back end 16 in a conventional manner Among other things, the operator station 20 may include a roof 22 that substantially covers the operator station, a floor (not shown) and a seat 24 for an operator to sit in while operating the machine. The operator station 20 may also include input and control devices 26, such as joysticks, display devices and other instrumentations, including consoles and communications systems that enable the operator to drive and operate the machine 10 and any implements. Typically these control devices are positioned within easy reach and sight of the operator within the station 20. During operation of the machine 10, the operator may manipulate the input devices 26 from inside the station 20 to perform various tasks. For example, the operator may position the machine 10 at a precise location and orientation, and thereafter move the machine along a precise path. While not illustrated, access to the operator station 20 may be by way of a door located at either or both sides of the machine 10.

The machine 10 may further include a front compacting member 30 and a back compacting member 32. Both the front compacting member 30 and the back compacting member 32 are rotatably coupled to the frame 12 and have an outer surface configured to rotate in contact with a substrate of paving material (not shown) beneath the machine 10. In the embodiment shown in FIG. 1, both the front compacting member 30 and the back compacting member 32 are compactor drums. The compactor machine 10 may be used at a job site, such as a construction site, to compact materials, and may generally include smooth compactor drums, or other similar ground engaging elements, such as a drum having cleats or teeth, tires, tracks and/or other rollers. The compactor machine 10 may also include an engine (not shown), such as an internal combustion engine, and a variety of mechanical, hydraulic and/or electrical systems for performing known functions. Such components and/or systems are well known to those skilled in the art and, therefore, will not be discussed herein in greater detail.

As further illustrated in FIGS. 1-5, a roof assembly 38 that substantially covers the operator station 20 may be mounted to the machine frame 12. Numerous pillars or support members 40 extending upwardly from the machine frame 12 may support the roof assembly 38 above the operator station 20 in a conventional manner. Likewise, additional, generally horizontal support members 42 may support a roof top panel 44 of the roof assembly 38 over the operator station 20 in a conventional manner. The roof assembly 38 may include one or more brackets 48 attached to the top panel 44, the brackets 48 extending along the length of any side of the top panel 44. As illustrated, the brackets 48 may add additional depth to the roof assembly 38 and may serve as mounting surfaces for various components, as detailed below. Also, because the machine 10 may be operated in an environment where there is an increased possibility of objects falling onto the roof, the roof assembly 38 may be adapted with falling object protective structures, as is customarily known. In addition, the roof assembly 38, whether on an open-air or an enclosed operator station, may be adapted with ridges, channels and/or gutters that allow for water runoff from, for example, condensation, rain or water during a washing cycle. In this manner, water may be prevented from draining into the operator station 20. The roof assembly 38 is illustrated as having four corners, specifically, a first corner 52, a second corner 54, a third corner 56 and a fourth corner 58. However, in other embodiments, it is to be understood that the roof assembly 38 may have more or fewer than four corners. The disclosed roof assembly 38, in addition to the functional aspects detailed below, may serve to shield the operator seated in the operator station 20 from light, glare, debris or inclement weather. Different elements of the roof assembly 38 may be made from different materials including, but not limited to, non-metallic materials, polymers, ceramics, metals or metal alloys.

The disclosed roof assembly 38 further includes a multi-function modular cover 60. Turning to FIGS. 2-4, illustrated in FIG. 2 is the roof assembly 38, including the modular cover 60 (shaded), as seen from a perspective below the roof assembly 38. Alternatively, FIG. 3 illustrates the roof assembly 38 having the modular cover 60 as seen from an above perspective. FIG. 4, in comparison, illustrates the top panel 44, the brackets 48 and other elements of the roof assembly 38 without the modular cover 60 attached. The modular cover 60 may be a pliable and resilient, non-metallic or plastic structure that is mounted to a portion of the top panel 44 and/or the bracket 48. For example, the modular cover 60 may be made from materials including, but not limited to, polyethylene, polypropylene, polyvinyl chloride, nylon, polycarbonate, polystyrene, polyurethane, synthetic resin and silicone. Alternatively, as also contemplated herein, the modular cover 60 may be a metallic material, in which case, the modular cover 60 may include multiple cover pieces that couple together to partially enclose a portion of the top panel 44 and/or the bracket 48, to which the cover pieces are also mounted. Such multiple metallic cover pieces of a modular cover may be coupled using any means known in the industry for fastening metallic parts; and like the non-metallic modular covers, a metallic modular cover may be mounted to any combination of edges or corners of the roof 22 of the operator station 20. In all cases, the modular cover 60 includes the multifunctional aspects described in detail below.

In the illustrated embodiments, the modular cover 60 includes two units 62, 64 extending along opposite sides of the roof assembly 38. More specifically, the illustrated modular cover 60 includes a first unit 62 extending between the first and fourth roof corners 52, 58, and a second unit 64 extending between the second and third roof corners 54, 56. The modular cover 60 may be attached to the support members 40, 42, the top panel 44 or the brackets 48. Depending on the specific application, it is common for different or similar work machines to have different widths, and therefore also have operator stations of different widths. The disclosed modular cover 60 may be adapted to operator stations of any width. Specifically, because the modular cover 60 extends along the roof 22 between a front end and a back end direction, i.e., from first and second corners 52, 54 to forth and third corners 58, 56, respectively, the first and second units 62, 64 of the modular cover 60 may be fitted to the roof of an operator station of any width (assuming the front end to back end depth of the operator station is the same). Alternatively, though not illustrated herein, the disclosed roof assembly 38 may include a modular cover 60 of two units that extend along opposite lengths of the roof, specifically, from first and fourth corners 52, 58 to second and third corners 54, 56, respectively. Such an alternative cover configuration may be adapted to operator stations of different depths as opposed to different widths. Also contemplated in the present disclosure are modular covers 60 of alternative sizes and shapes. For example, contemplated herein is a modular cover 60 of only a single unit disposed on a single corner 52, 54, 56, 58 of the roof assembly 38, or along the length of any side of the roof assembly 38. Alternatively, the cover 60 may be a single unit that spans the entirety of the roof 22. Moreover, the modular cover 60 may include two, three or four units, disposed at multiple or all corners 52, 54, 56, 58 of the roof assembly 38, or along the length of any side of the roof assembly 38. In all cases, a modular cover 60 of the present disclosure is multifunctional, as detailed further below.

Among other things, the roof assembly 38 and the modular cover 60 of an operator station 20 may be adapted or associated with various technology solutions for improving the operation and function of the machine 10. For example, the roof assembly 38 may include numerous lighting devices, for both area lighting purposes, as well as informational purposes. In addition, as commonly employed in the industry, the roof assembly 38 may include antennas for GPS, cellular, radar, WIFI, satellite, radio and/or other devices. Further, cameras and/or other recording devices, communication devices, sensors, trackers, etc. may also be incorporated in roof assemblies. The use and advantages of these information/communication systems and their associated technology is commonly understood in the industry, and therefore will not be further detailed herein.

Some such technological enhancements of the roof assembly 38 are illustrated in FIGS. 2-5. For example, FIGS. 2 and 3 illustrate various lighting solutions in the roof assembly 38. Specifically, one or all corners 52, 54, 56, 58 of the roof assembly 38 may include an adjustable halo light 70 incorporated in the modular cover 60. The halo lights 70 may be mounted to any portion of the top panel 44 or other structure associated therewith, and may project light through openings in the modular cover 60, as detailed below. Such halo lights 70 or other similarly positioned lights may illuminate the work area around the machine 10 as well as the work tool(s) of the machine, thereby aiding in the maneuvering and operating of the machine 10. The roof assembly 38 may also be adapted with beacon lights 72. The beacon lights 72 may include light-emitting diodes (LEDs) integrated in the roof assembly 38, for example, in the top panel 44, the brackets 48, at the corners 52, 54, 56, 58 of the modular cover 60 or along any length of the modular cover 60. Further, like the halo lights 70, the beacon lights 72 may project light through openings in the modular cover 60. As illustrated, one beacon light 72 may be positioned at the center of bracket 48 (see FIG. 2 between first and second corners 52, 54), while another beacon light 72 may positioned at third and fourth corners 56, 58 (see FIG. 3). This configuration of beacon lights 72 at front facing bracket 48 and at the angled corners 56, 58 of the roof assembly 38 allows for visibility of at least one beacon light 72 at any position, 360 degrees around the work machine 10. As such, the beacon lights 72 may allow for personnel outside the machine 10 to visibly identify and locate the machine 10.

Other lighting devices incorporated in the roof assembly 38 of a work machine 10 may function as head lights, flood lights, distance lights, warning lights or other informational lighting or systems. Further, depending on the application, any number of any variety of lights may be incorporated in the roof assembly 38 or modular cover 60, all of which may be adjustable. Moreover, the lighting solutions may include a plurality of lights located at various positions and orientations on the roof assembly 38. All light components may be mounted to the roof structure, for example, to the top panel 44, to brackets 48 or to other structure associated with the roof 22. Alternatively, the light components, including light shrouds or housings, may be integrated with the modular cover 60 that is mounted to the roof 22. The lights may be a combination of any light types including, but not limited to, incandescents, fluorescents, high intensity halogen lights, high intensity discharge (HID) lights and LEDs. While not specifically illustrated, conventional light mountings and electrical wiring and harnesses therefor may also be incorporated in the roof assembly 38 for the proper control and functioning of the lights. Manual, electrical and/or automated adjustment and control of all lights may be employed, as commonly understood in the industry. Electrical wiring and control of lighting solutions are well understood in the industry and, therefore, will not be discussed herein in greater detail.

Figure 5:
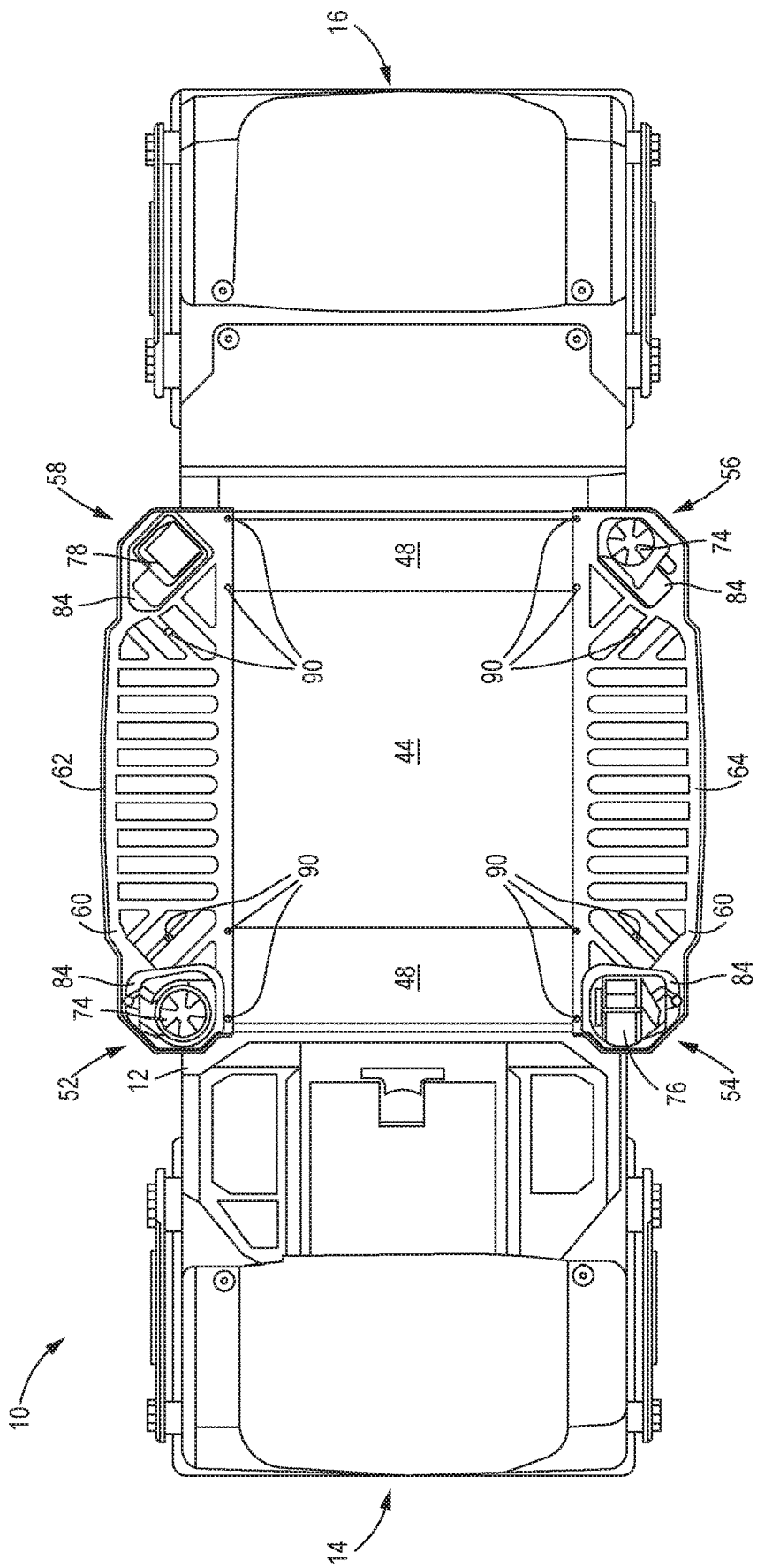
FIG. 5 is a top view of the compactor machine of FIG. 1, in accordance with the present disclosure.

FIGS. 3-5 also illustrate various antennas that maybe included in the roof assembly 38 of the work machine 10. For example, the first and third corners 52, 56 may include GPS antennas 74. Further, the second corner 54 may include a satellite antenna 76 while the fourth corner 58 may include a cellular antenna 78. The illustrated configuration of antennas of GPS, satellite and cellular technologies mounted on the roof assembly 38 is only one of many configurations contemplated in the present disclosure. Additional devices and antennas associated therewith may also be incorporated, including radio, sensors, trackers, etc. One or more of any antennas or other devices may be incorporated in the roof assembly 38, and may be positioned around the roof assembly 38 in any order or desired placement. In all cases, the antennas 74, 76, 78 should be mounted in a manner that provides the antennas with exposure to and a clear path to the sky, therefore allowing for signal transmission to/from a satellite, transmitter, tower, controller or other communication infrastructure. In the illustrated embodiment, the antennas 74, 76, 78 are mounted on brackets 80 attached to the corners 52, 54, 56, 58. Alternatively, depending on the design, the antennas 74, 76, 78 may be attached directly to the top panel 44 or the brackets 48. The antennas 74, 76, 78 and other technology may be mounted to the brackets 48, 80 or the top panel 44 using any fastening means known in the industry. Likewise, the brackets 80 may be attached to the top panel 44 or the brackets 48 using any fastening means known in the industry. In addition, as is the case for the lighting components, rather than mounting the antennas 74, 76, 78 directly to the brackets 48, 80 or the top panel 44, the antennas 74, 76, 78 may be integrated with the modular cover 60 that is mounted to the roof 22. While not illustrated, conventional mountings and electrical wiring for the antennas 74, 76, 78, as well as between antennas 74, 76, 78 and associated receivers, computers, controllers and/or input or output devices, may be incorporated in the roof assembly 38. Electrical wiring and control of these components, as well as the transmission of data, is commonly practiced and well understood in the industry, and therefore not detailed further herein.

Figure 6:
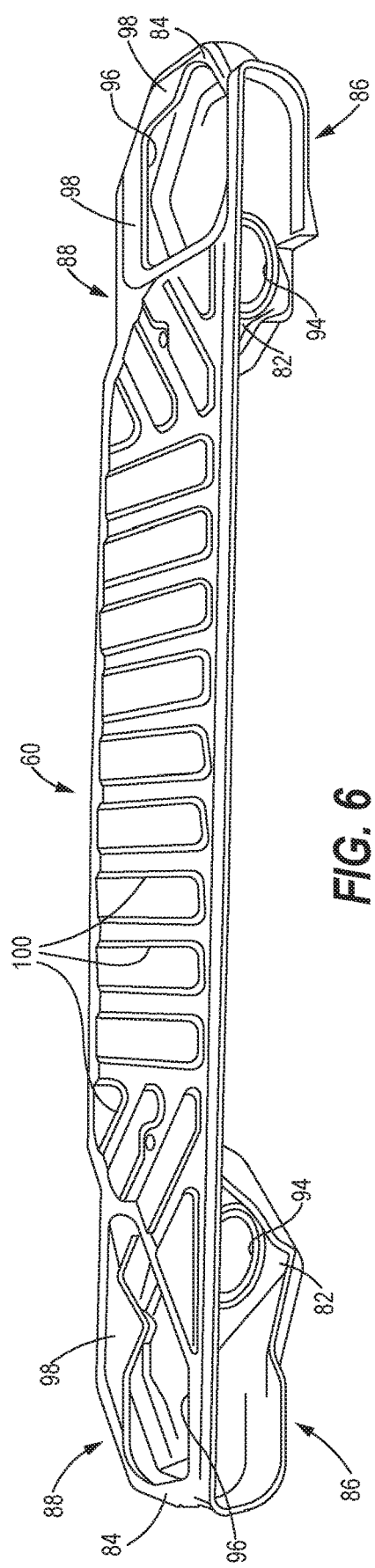
FIG. 6 is a perspective view of an exemplary embodiment of a modular cover, in accordance with the present disclosure.
Figure 8:
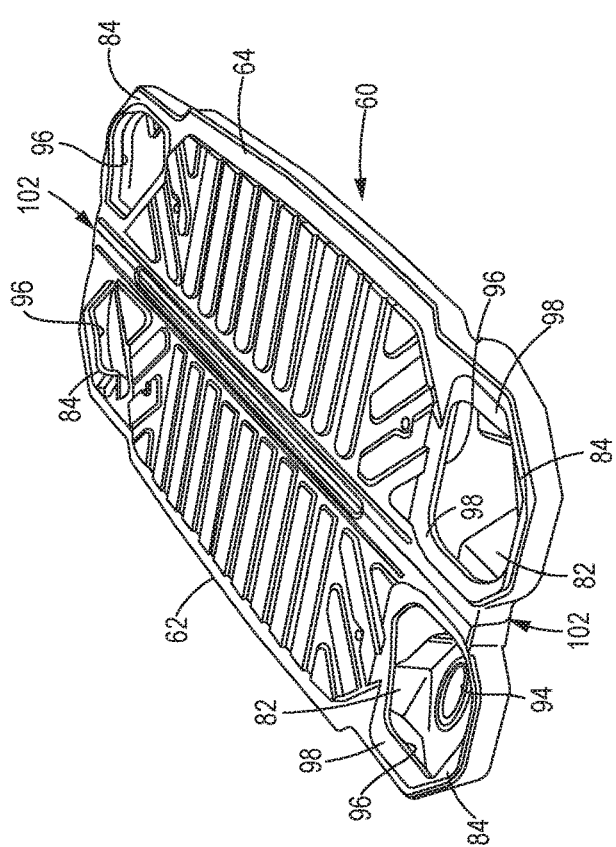
FIG. 8 is a perspective view of an exemplary embodiment of two joined modular covers, in accordance with the present disclosure.
Figure 7:
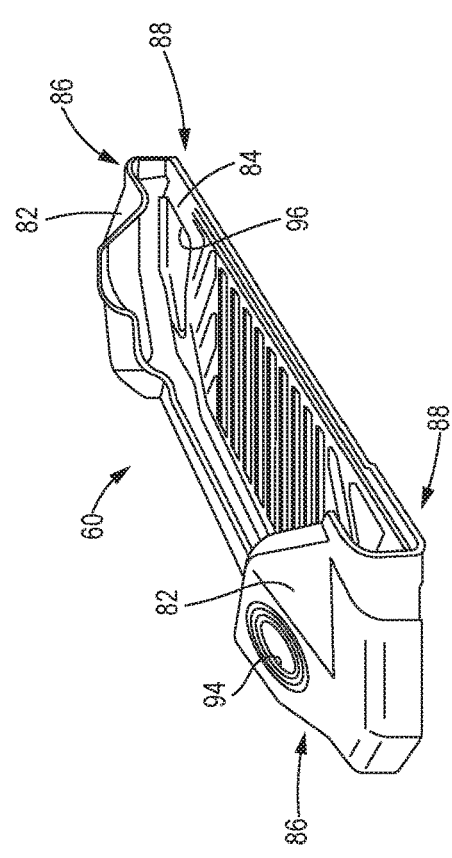
FIG. 7 is a perspective view of an exemplary embodiment of a modular cover, in accordance with the present disclosure.

Turning back to the modular cover 60, as best illustrated in FIGS. 2, 3 and 5, the modular cover 60 is provided with compartments or pockets 82, 84 for accommodating the above-described technology, including lighting devices and antennas. Such pockets 82, 84 may contain, protect and hide much of the structure of the lights and antennas, while intentionally designed openings in the pockets 82, 84 allow for light to be projected there through and for signals to be received, as detailed below. FIGS. 6-8 illustrate the modular cover 60 independent of the work machine 10. The modular cover 60 may be a generally elongated rectangular, partially hollow structure, and as described above, the modular cover 60 may be a pliable and resilient, non-metallic or plastic material. The cover may include a lower portion 86 spaced apart from an upper portion 88, the pocket 82 disposed there between. As such, the modular cover 60 may be installed on the top panel 44 by manipulating and sliding the cover 60 onto opposite edges of the top panel 44 and over any relevant corner-mounted lights and/or antennas. As seen in the illustrated embodiments of FIGS. 2, 3 and 5-8, the lower portion 86 of the cover 60 may include pockets 82 for accommodating the halo lights 70, and the upper portion 88 may include pockets 84 for accommodating the antennas 74, 76, 78. Specifically, when installed on the top panel 44, the lower portion 86 is downwardly-exposed while the upper portion 88 of the cover 60 is exposed upwardly. As such, the pockets 82 of the lower portion 86 may receive and contain downwardly-directed halo lights 70, which may be mounted on an underside of the top panel 44 or the brackets 48, 80. Likewise, the pockets 84 of the upper portion 88 may receive and contain the antennas 74, 76, 78 in a upward orientation, which is required for the proper functioning and sensitivity of the antennas 74, 76, 78. Bolts 90 may be used anywhere along the length of the modular cover 60 in order to secure the modular cover 60 to the roof assembly 38. Specifically, the bolts 90 may pass through aligned holes in the cover 60, top panel 44 and brackets 48, thereby securing the cover 60 to the roof assembly 38. Attachment of the modular cover 60 to the roof assembly 38 may include any number of elements, such as, but not limited to, bolts, lugs, ties, clamps or any other suitable means known in the industry for fastening or coupling parts.

The illustrated pockets 82 in the lower portion 86 of the modular cover 60 are configured for containing the halo lights 70; however, the pockets 82 may be designed for any light devices or shapes known in the art. Further in this regard, round openings 94 in the pockets 82, which allow for light from the halo lights 70 to be directed there through, may also be of any shape necessitated by the shape of the lighting device contained in the pocket 82. The pockets 82 may be designed with sufficient space therein so as to allow for manual or electrical adjustment of the halo lights 70. As such, the halo lights 70 may be directed towards a ground area, a work implement or in any direction desired, as commonly understood in the art. The beacon light 72 may also project light through the modular cover 60, as illustrated in FIG. 3. Specifically the structure and necessary electrical components of the beacon light 72 may be contained beneath the cover at corner 58, for example; and the cover may include an additional opening that aligns with the beacon light 72, thereby allowing light to project there through. Such an opening for the beacon light 72 is not illustrated in FIGS. 6-8; however, it is to be understood that a beacon light opening may be included at any location desired on the modular cover 60. Notably, while the pockets 82 and structure of the disclosed modular cover 60 allow for the halo lights 70 and the beacon lights 72 to project light there through, the modular cover 60 protects the structure of the lighting devices, as well as concealing them from view.

With regard to the pockets 84 in the upper portion 88 of the modular cover 60, these pockets 84 may be designed to contain the disclosed configuration of antennas 74, 76, 78 and/or other configurations of antennas, technology or devices known in the industry. Similar to the pockets 82 in the lower portion 86, the pockets 84 in the upper portion 88 also include openings 96 through which the antennas 74, 76, 78 may partially protrude, and more importantly, through which signals to and from the antennas 74, 76, 78 may pass. As seen in the illustrated embodiments, the openings 96 may be of various shapes to accommodate the particular shape of each roof-mounted antenna 74, 76, 78. Alternatively, the openings 96 may be of a uniform shape that accommodates all antennas. The pockets 84 may form a valley-type structure having the openings 96 disposed at the bottom. The antennas 74, 76, 78, as illustrated, may therefore be partially contained by the cover 60. In this manner, the pocket 84 structure blocks the visibility of the antennas 74, 76, 78, especially from any onlookers having a line of sight parallel to or below the roof assembly 38. In all cases, the openings 96 of the pockets 84 should be sufficiently large and shaped so as not to interfere with the functioning of the antennas 74, 76, 78. As mentioned above and well understood in the industry, GPS and other antennas require an open exposure to the sky that allows for a clear path of signal transmission to/from satellites and other communication infrastructure. In order to facilitate and maximize the exposure of the antennas 74, 76, 78 to the sky, the pockets 84 may further include an inclined wall 98 at least partially around the openings 96 for the antennas 74, 76, 78. This design allows for maximum exposure of the antennas 74, 76, 78 to the sky and minimizes any potential for signal interference by the modular cover 60. At the same time, by surrounding the antennas 74, 76, 78, the pocket 84 structure partially encloses the antennas 74, 76, 78, as illustrated. In this manner, the pockets 84 of the disclosed modular cover 60 allow for signal transmission to/from the various roof-mounted antennas 74, 76, 78, while also protecting the structure of the antennas 74, 76, 78, as well as concealing them from view.

Though not specifically illustrated in the figures, it is further contemplated in the present disclosure that the modular cover 60 may be designed to include additional pockets and/or openings for other technology, as well as any electrical components or wiring associated therewith. For example, the cover 60 could include sufficient accommodation space, as well as an opening, for a roof-mounted camera and/or other recording devices. In this manner, the cover 60 would allow for proper functioning of the camera while also protecting and concealing it from view. Likewise, the cover 60 may be designed to accommodate, protect and conceal other communication devices, sensors, trackers, etc. also incorporated in roof assemblies.

Figure 9:
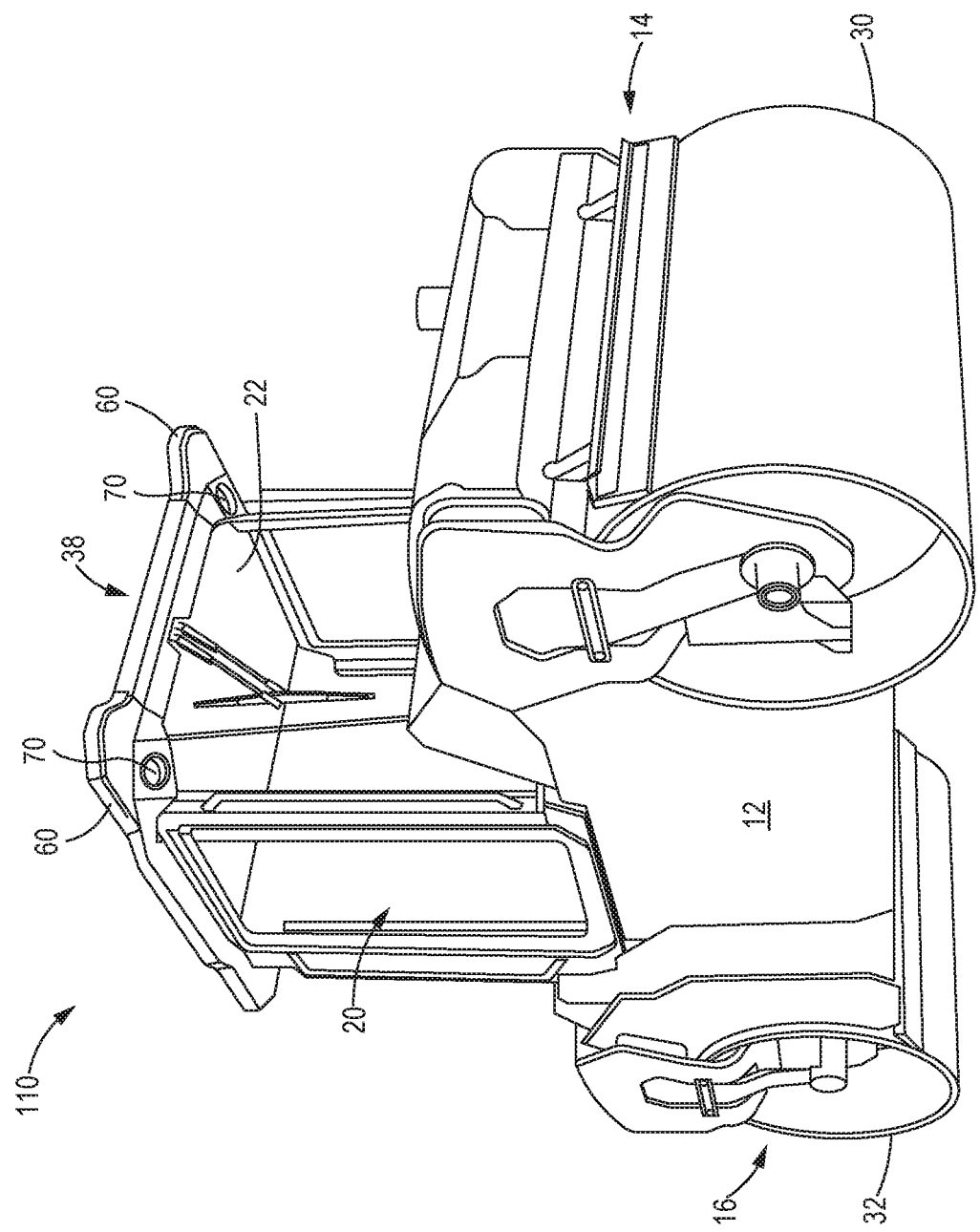
FIG. 9 is a perspective view of a compactor machine that embodies elements of the present disclosure.

Turning to FIG. 9, another exemplary work machine 110 that incorporates elements of the present disclosure is illustrated. Specifically, FIG. 9 illustrates a compactor machine 110 having a cab or enclosed operator station 20 as opposed to the open-air operator station of FIGS. 1-3. Such enclosed operator stations 20 may be preferred in operational environments where protection from outside weather, dust and generally harsh conditions is necessitated. Like the machine 10 of FIG. 1, the machine 110 of FIG. 9 also includes a frame 12, a front end 14 and a back end 16. The machine 110 may further include a front compacting member 30 and a back compacting member 32. The machine 110 may be driven, and numerous functions of the machine 110 may be controlled, by an operator positioned in the operation station 20. The enclosed operator station 20, which may include windows and walls, is coupled to the frame 12 between the front end 14 and the back end 16 in a conventional manner Though not illustrated in FIG. 9, the operator station may include a seat, as well as input and control devices, such as joysticks, display devices and other instrumentations. The enclosed operator station 20 may further include an air conditioning unit, which may be mounted anywhere within the operator station 20, as well as additional roof enhancements such as, but not limited to, water runoff drains and falling object protective structures, as is customarily known.

The presently disclosed modular cover 60 may also be incorporated in the roof assembly 38 of the machine 110 having the enclosed operator station 20. While the precise structural shape of the cover 60 may be different for the enclosed operator station 20, the multifunctionality of the modular cover 60 may be maintained. As illustrated in FIG. 9, and similar to the roof assembly of FIGS. 1-3, the modular cover 60 may be mounted at opposite outer edges of the roof assembly 38, the cover 60 including two elongated units disposed in a front end 14 to back end 16 direction. Likewise, the modular cover 60 may receive and be mounted to a top panel 44 of the roof assembly 38, as well as any additional structure associated therewith (not shown). The modular cover 60 may also accommodate, protect and conceal various roof-mounted enhancements, such as downwardly-directed halo lights 70, as well as upwardly-directed antennas (not shown). In this manner, the disclosed modular cover 60 may be adapted to work machines having open-air operator stations and to work machines having enclosed operator stations. In both cases, the modular cover 60 may partially house, protect and conceal various technologies, including lights, antennas and cameras, form view. As described above with regard to the machine 10 of FIGS. 1-3, the modular cover 60 may be adapted to enclosed operator stations 20 of differing widths. Further, while the modular cover 60 is illustrated in FIG. 9 as two units, it is contemplated herein that the modular cover 60 for the enclosed operator station 20 may be only a single unit disposed on a single corner of the roof assembly 38, along the length of any side of the roof assembly 38 or spanning the entirety of the roof 22. Moreover, the modular cover 60 may include two, three or four units, disposed at multiple or all corners of the roof assembly 38, or along the length of any side of the roof assembly 38. In all cases, the modular cover 60 for the enclosed operator station 20 is multifunctional, as detailed above.

Figure 10:
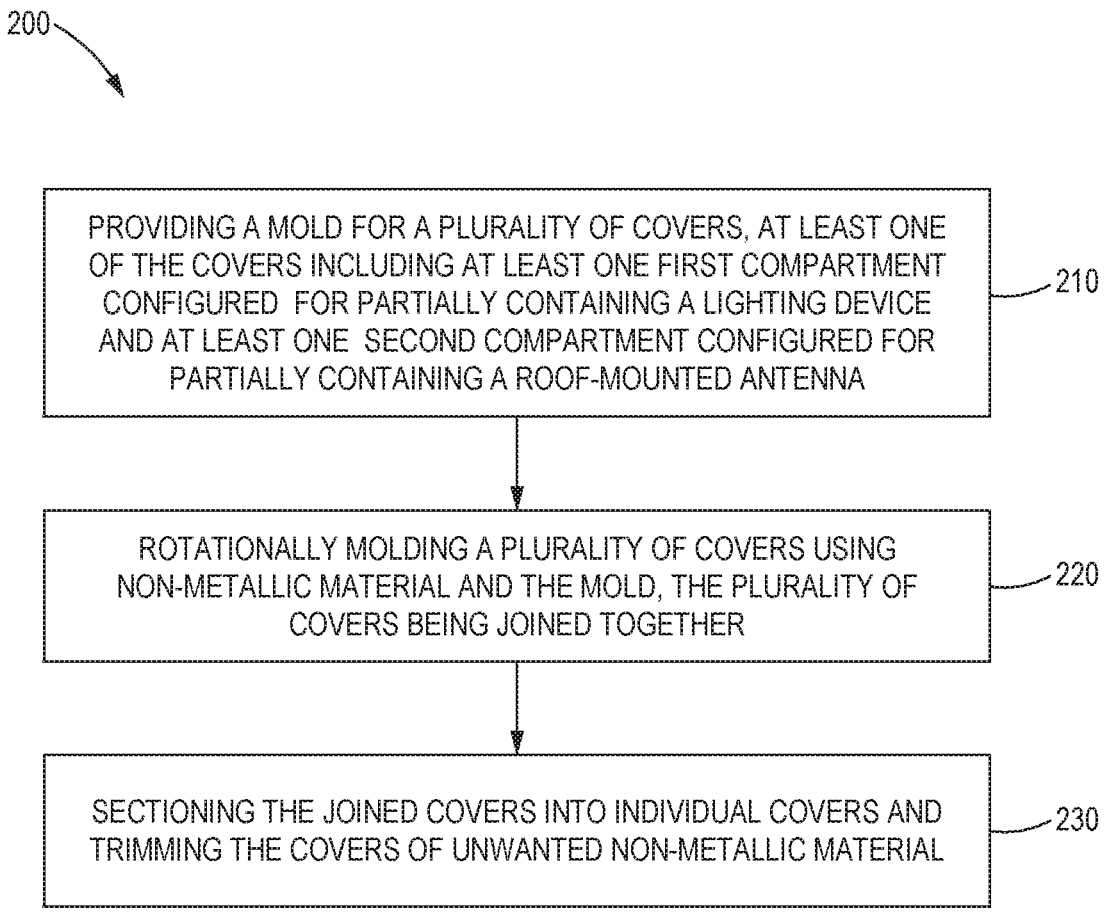
FIG. 10 is a flow chart for a method of manufacturing a cover configured for attachment to the roof of an operator station of a work machine, in accordance with the present disclosure.

Further contemplated in this disclosure is a method 200 for manufacturing the modular cover 60 configured for attachment to the roof 22 of an operator station 20 of a work machine 10, 110. FIG. 10 shows a flow chart for a method 200 of manufacturing the modular cover 60. As discussed above, the modular cover 60 may be made from non-metallic or plastic materials including, but not limited to, polyethylene, polypropylene, polyvinyl chloride, nylon, polycarbonate, polystyrene, polyurethane and silicone. Rotational molding, also called rotomolding, is a known process for relatively inexpensively manufacturing hollow plastic parts in a variety of shapes, sizes and textures. Among other things, the rotational molding process includes creating a hollow mold formed in the shape of the component to be formed. In this regard, step 210 of the method 200 of manufacturing a cover 60 may include providing a mold for a plurality of covers, at least one of the covers including at least one first compartment configured for partially containing a lighting device and at least one second compartment configured for partially containing a roof-mounted antenna.

Such molds for rotomolding are typically manufactured from, for example, stainless steel or aluminum. As described above and illustrated clearly in the figures, the cover 60 may include two elongated cover units 62, 64 each having a lower portion 86 that is spaced apart from an upper portion 88. A single mold may be used to create the cover 60 having two or more cover units 62, 64; and the mold may also provide each individual cover with the multifunctional features described above. For example, the mold design may include a first compartment for forming the compartment or pocket 82, which may partially contain the halo light 70. In addition, the mold design may include a second compartment for forming the compartment or pocket 84, which may partially contain the roof-mounted antenna 74, 76, 78. Further, the mold design may include additional structural features for the cover 60, for example, inclining walls 98, the purposes of which are described above. The mold may also provide for aesthetic design features, such as but not limited to, ribs 100, angles or textures in the structure of or on the surfaces of the cover 60, thereby enhancing the appearance of the roof assembly 38.

In order to form the actual cover structure, step 220 of the method of manufacturing the cover 60 may include rotationally molding a plurality of covers using non-metallic material and the mold, the plurality of covers being joined together. As well understood in the industry, this step 220 may involve pouring into the mold a suitable quantity of plastic powder, depending on the thickness of plastic desired. Thereafter, the mold may be closed and heated in an oven while rotating so as to evenly distribute and adhere the melting plastic powder onto all surfaces, edges and crevices of the mold. The mold may then be cooled using fans or water, thereby allowing the plastic to solidify into a single hollow body having a predetermined wall thickness. Thereafter, the rotomolded product, which may include a cover 60 of two or more cover units 62, 64 in a single part, may be removed from the mold. FIG. 8 illustrates the product of a rotationally molded cover 60 prior to the individual cover units 62, 64 being separated, as described below with regard to step 230. Specifically, FIG. 8 depicts the two cover units 62, 64 aligned together and joined along a middle, dividing line 102 between the cover units 62, 64. While the figures illustrate a cover 60 that includes two elongated cover units 62, 64 having hollowed-out corners, each of which ultimately receives two corners of the roof 22 and covers the length there between, the cover 60 may instead be one or more cover units, each configured for receiving only a single corner of a roof 22, as described above. Therefore, further contemplated herein is a mold and a rotationally molded plastic product including two or more multifunctional cover units, each unit configured to be mounted on only one corner of a roof assembly of an operator station. Likewise, the mold and rotationally molded plastic product could be two or more multifunctional cover units of any shape configured for mounting anywhere on the roof assembly of an operator station.

Because the rotational molding process creates a single part or product of multiple cover units, step 230 of the method 200 of manufacturing a cover 60 may include sectioning the joined covers into individual covers and trimming the covers of unwanted non-metallic material. Specifically, a cutting tool may be applied to the rotomolded product in order to separate the joined individual cover units 62, 64. For example, the single, rotomolded hollow part may be cut in half along the middle, dividing line 102, thereby rendering two separate, individual cover units 62, 64. Where more than two cover units are joined together in a single rotomolded product, sectioning along multiple lines may be required in order to separate individual cover units. In addition, step 230 may involve machining of the plastic cover 60 using cutting tools or other devices in order to trim the cover 60 to the desired final dimensions and to rid the cover 60 of any unwanted, excess non-metallic material or plastic, as commonly understood in the industry. For example, in order to render a cover 60 in the shape of that illustrated throughout the figures, excess plastic adjacent the lower portion 86 of the cover 60 may be cut away. In addition, trimming at step 230 may cut away plastic form the openings 94 in the pockets 82 (through which the halo lights 70 project). Further, while not illustrated in FIGS. 6-8, openings may be formed in any corners or other surfaces of the cover 60 in order to accommodated and project beacon lights 72 (see FIG. 3). Likewise, the openings 96 in the pockets 84, wherein the antennas 74, 76, 78 are partially contained, may be formed by the trimming at the step 230. Notably, the openings 94, 96 formed at this step 230 may be of any desired size or shape depending on the relevant light solutions and antennas or other technology. This type of general finishing of rotomolded plastic products is commonly practiced and understood in the industry for both practical and aesthetic purposes.

While manufacturing of the disclosed modular covers 60 via rotational molding is described in detail above, other methods of manufacturing the modular covers 60 are also contemplated herein, including blow molding, injection molding, compression molding, casting, thermoforming, 3D printing, etc. Further, while non-metallic or plastic modular covers 60 are described and illustrated throughout the figures, and the manufacturing of plastic modular covers 60 is detailed above, the present disclosure also contemplates modular covers made of metallic material, in which case, the modular cover may include multiple metallic pieces that couple together to receive and to mount onto any combination of edges and/or corners of the operator station roof. Such metallic covers may be formed using any known method in the industry for manufacturing metal parts, for example, by casting, metal injection molding, machining, stamping, punching, 3D printing, welding, etc.

INDUSTRIAL APPLICABILITY

The disclosed modular cover 60 for attachment to the roof 22 of an operator station 20 may finds potential applicability in a variety of a work machines 10, 110 and in a variety of settings. For example, any work machine that includes an operator station 20 may potentially be adapted with the disclosed modular cover 60. Such machines may be employed in paving, construction, agricultural or other industries; and potential machines may include compactor machines, motor graders, wheel loaders, backhoe loaders, excavators, agricultural tractors, dozers, etc. As detailed above, the disclosed covers 60 are applicable to both open-air and enclosed operator stations 20. In all cases, the cover 60 imparts a multifunctional enhancement to the roof assembly 38, including providing for the accommodation, the protection of and the concealment of roof-mounted light solutions and antennas, as well as other technology.

Specifically, as detailed above, the disclosed modular cover 60 of roof assembly 38 may be mounted to an operator station roof 22 adapted with halo lights 70, beacon lights 72, as well as any other light solutions known in the art. The cover 60 may include pockets 82 and openings 94 for such lights in the cover lower portion 86; and when received onto the roof 22, the cover 60 may contain the structure of the lights therein, while allowing for projection of light there through. In this manner, the cover 60 may not only protect the structure of the lights from damage, the cover also blocks visibility, and therefore potential theft of the lights by onlookers, thereby saving on cost and maintenance time. Likewise, the cover 60 provides for the protection and concealment of roof-mounted antennas 74, 76, 78. Specifically, as detailed above, the pockets 84 and openings 96 in the cover upper portion 88 may contain and surround various antennas 74, 76, 78 required for the functioning of the work machine 10, 110, including, for example, GPS, cellular and satellite antennas. Notably, the disclosed cover 60 and pocket 84 structure allows for open exposure of the antennas 74, 76, 78 to the sky, therefore allowing for clear, uninterrupted signal transmission to and from the antennas 74, 76, 78.

As explained herein, conventional roof-mounted technology for work machines, e.g., light solutions and antennas, may present difficulties with regard to storage height limitations and their vulnerability to theft when the machine is not being operated. In the past, conventional roof-mounted lights and antennas have required additional, cumbersome mounting configurations for alternatively mounting and dismounting the components, depending on whether the machine is operating, not operating but on site overnight, or in storage for shipping. Advantageously, the disclosed cover 60 and roof assembly 38 provides a solution for avoiding this burdensome task by eliminating the need for any such additional mounting/dismounting configurations while also concealing the components. As such, the additional cost, weight, height and time associated with the mounting/dismounting configurations are avoided, thereby improving on the overall efficiency of an operation. Further, when employing the presently disclosed covers 60, not only is an onlooker's access to the components restricted by the cover 60, the components are not even visible to the onlooker to begin with. In this manner, the presently disclosed covers 60 provide additional security against theft of these high value components.

The disclosed modular covers 60 also provide the advantage of being adaptable to countless work machines having covered operator stations 20. An open-air operator station 20, like that depicted in FIGS. 1-3, may include the two elongated cover units 62, 64, each received on two corners and stretching from a front end 14 side of the roof to a back end 16 side. This cover 60 is illustrated as disposed on a compacter machine 10 of a standard width. However, should the compacter machine 10 be of a wider width, and include a wider operator station, the cover 60 may easily be adapted thereto. It is to be understood that, were the cover units 62, 64 alternatively disposed in a side-to-side orientation, they could also be adaptable to roofs of operator stations having differing depths. Further, as described herein, one or more individual modular covers may be disposed on a single or multiple corners of the roof 22, or anywhere on the roof surface that allows for their multifunctionality with regard to the roof-mounted technology components. The disclosed multifunctional modular cover 60 is also adaptable to enclosed operator stations 20, as illustrated FIG. 9. Indeed, advantageously, the present disclosure provides for modular covers 60 that may be mounted to any number of work machines, having operator stations of any width or depth. In this manner, the modular cover 60 may be designed for and installed on roofs with a standard configuration of lights and antennas, common across many work machines. Alternatively, the modular cover 60 may be custom designed for other light and antenna configurations common to one or certain other series of machines. As such, the modular covers 60 disclosed herein may be interchangeable between various machines, should the need arise. Furthermore, contemplated within this disclosure is the possibility of retrofitting existing work machines with the disclosed cover 60. For example, the roof assemblies of existing machines, with or without roof-mounted light components and antennas, may be modified with new structure (such as brackets 48, 80 for mounting purposes), equipped with or substituted with suitable light components and antennas, and thereafter adapted with the modular cover 60 designed for that particular machine or series of machines. Alternatively, a cover 60 for retrofitting an existing machine could include the technology components already integrated therein, as described above. In this manner, countless existing work machines may be upgraded with the structural protection and theft prevention security afforded by the disclosed multifunctional modular covers 60.

In addition to the above described advantages of the modular covers 60, presently disclosed is a method 200 of manufacturing modular covers 60 at low cost, thereby further improving on overall efficiency. Specifically, the modular covers 60 configured for attachment to the roof 22 of an operator station 20 of a work machine 10, 110 may be manufactured using a rotational molding process. Rotational molding is well known in the industry for forming generally hollow plastic components. Notably, rotationally molded components are manufactured relatively quickly and with significantly less cost than that of corresponding metallic parts, and are also much lighter in weight while maintaining a high quality. As described above, the rotational molding process may be used here to form a single part or product having a plurality of cover units 62, 64 joined together. While the illustrated embodiments include two elongated cover units 62, 64 joined together, as also described above, additional quantities may be formed in a single part. The single part may be sectioned into individual cover units 62, 64 and trimmed of any unwanted, excess plastic, as commonly understood in the industry. This trimming may give the cover 60 its final desired dimensions as well as provide necessary openings 94, 96 in the cover 60, as described above. Because of the shape of the disclosed modular covers 60, and their suitability for manufacturing by rotational molding, multiple covers 60 may be manufactured in a single part, thereby advantageously reducing manufacturing costs and increasing overall efficiency.

All references to the disclosure or examples thereof are intended to reference the particular example being discussed at that point and are not intended to imply any limitation as to the scope of the disclosure more generally. Also, it will be apparent to those skilled in the art that various modifications and variations can be made to the covers, roof assemblies and methods of the present disclosure without departing from the scope of the disclosure. Other embodiments will be apparent to those skilled in the art from consideration of the specification and practice of the embodiments disclosed herein. Accordingly, it is intended that the disclosure be considered as exemplary only, and embracing all alternatives, modifications and variations, which fall within the spirit and scope of the appended claims.

What is claimed is:

1. A cover configured for attachment to the roof of an operator station of a work machine, comprising:
    at least one first compartment configured for partially containing a lighting device of the work machine; and
    at least one second compartment configured for partially containing a roof-mounted antenna of the work machine, the second compartment disposed in a generally upwardly-exposed portion of the cover when attached to the roof.

2. The cover of claim 1, wherein the first compartment is disposed in a generally downwardly-exposed portion of the cover when attached to the roof.

3. The cover of claim 1, wherein the cover comprises two cover units configured for attachment at opposite edges of the roof.

4. The cover of claim 1, further comprising an inclined wall in the second compartment configured to at least partially surround the roof-mounted antenna.

5. The cover of claim 1, wherein the first compartment is configured to at least partially conceal the lighting device and the second compartment is configured to at least partially conceal the roof-mounted antenna.

6. The cover of claim 1, wherein the cover is a non-metallic product of rotational molding.

7. The cover of claim 1, wherein the cover is configured for attachment to an open-air operator station.

8. The cover of claim 1, wherein the cover is configured for attachment to an enclosed operator station.

9. The cover of claim 1, wherein the lighting device is adjustable.

10. The cover of claim 1, wherein the roof-mounted antenna is a GPS antenna.

11. The cover of claim 1, wherein the cover is attached to the roof as a retrofit upgrade to an existing work machine.

12. A method of manufacturing the cover of claim 1, comprising the steps of:
   providing a mold for a plurality of covers;
   rotationally molding the plurality of covers using non-metallic material and the mold, the plurality of covers being joined together; and
   sectioning the joined covers into individual covers and trimming the covers of unwanted non-metallic material.

13. The method of claim 12, wherein the at least one first compartment is disposed in a generally downwardly-exposed portion of the cover when attached to the roof, and the at least one second compartment is disposed in a generally upwardly-exposed portion of the cover when attached to the roof.

14. The method of claim 12, wherein the mold is for two cover units.

15. The method of claim 12, wherein trimming the covers of unwanted non-metallic material comprises forming openings in the covers.

* * * * *